United States Patent [19]
Itoh

[11] Patent Number: 5,608,640
[45] Date of Patent: Mar. 4, 1997

[54] NUMERICAL CONTROL METHOD AND APPARATUS THE SAME

[75] Inventor: Ietoshi Itoh, Tokyo, Japan

[73] Assignee: Sony Corporation, Japan

[21] Appl. No.: 362,908

[22] Filed: Dec. 23, 1994

[30]     Foreign Application Priority Data

Dec. 28, 1993 [JP] Japan .................................. 5-335798

[51] Int. Cl.⁶ ................................................ G06F 19/00
[52] U.S. Cl. .................................. 364/474.3; 318/568.18; 364/474.15
[58] Field of Search .................... 364/167.01, 474.15, 364/474.3, 474.28, 474.29, 474.31, 474.32, 474.33, 474.34, 474.35; 318/568.11, 568.18, 571, 573, 574, 569

[56]              References Cited

U.S. PATENT DOCUMENTS

| | | | |
|---|---|---|---|
| 4,652,804 | 3/1987 | Kawamura et al. | 318/573 |
| 4,829,219 | 5/1989 | Penkar | 318/568.18 |
| 4,916,636 | 4/1990 | Torii et al. | 318/568.18 |
| 4,994,978 | 2/1991 | Kawamura et al. | 364/474.3 |
| 5,004,968 | 4/1991 | Mizuno et al. | 364/618 |
| 5,057,756 | 10/1991 | Hara | 318/568 |
| 5,331,542 | 7/1994 | Itoh . | |
| 5,373,439 | 12/1994 | Jeon | 364/474.3 |

FOREIGN PATENT DOCUMENTS 4-157508  5/1992  Japan .

*Primary Examiner*—Roy N. Envall, Jr.
*Assistant Examiner*—Thomas E. Brown
*Attorney, Agent, or Firm*—Ronald P. Kananen

[57]              ABSTRACT

To control the operation of an actuator in the minimum time and with a high efficiency for an operation of a short pitch. A numerical control method for controlling the operation of at least one actuator by a servo circuit having a certain characteristic. The numerical control method is characterized in that an eigen value ($\beta$) by which an amount of movement up to an eigen acceleration and deceleration time (Tp) of the servo circuit becomes one-half of a target amount of movement ($\Delta\theta$) which is input and a step signal of a value ($\beta \cdot \Delta\theta$) obtained by multiplying this eigen value with the target amount of movement is input to the servo circuit, whereby the operation of the actuator during a time from at least the start of the operation to the eigen acceleration and deceleration time is controlled.

14 Claims, 11 Drawing Sheets

$K_P, K, K_i$ : SERVO PARAMETER
$T_S$ : TIME
$J$ : MOTOR+LOAD INERTIA
$\theta r$ : POSITION INSTRUCTION INPUT
$\theta o$ : POSITION OUTPUT SURFACE AREA OF HATCHING IS $\Delta \theta / 2$

- SYMMETRICAL EXP PATTERN

| n | t | $\theta_i(T_P + nT_{SS})$ |
|---|---|---|
| 1 | $T_P + T_{SS}$ | $\Delta\theta - \theta_{o\overline{N-1}}$ |
| 2 | $T_P + 2T_{SS}$ | $\Delta\theta - \theta_{o\overline{N-2}}$ |
| 3 | $T_P + 3T_{SS}$ | ⋮ |
| 4 | ⋮ | ⋮ |
| n | $T_P + nT_{SS}$ | $\Delta\theta - \theta_{o\overline{N-n}}$ |
| N−1 | $T_P + (N-1)T_{SS}$ | $\Delta\theta - \theta_{o1}$ |
| N | $T_P + NT_{SS} = 2T_P$ | $\Delta\theta$ |

NUMERICAL CONTROL METHOD AND APPARATUS THE SAME

BACKGROUND OF THE INVENTION

1. Field of the Invention

The present invention relates to a numerical control method and a numerical control device for a servo system which is preferably applied to short pitch movement such as for example 50 mm or less.

2. Description of the Related Art

As one indicator considering the motion ability of a robot, there may be mentioned the "tact time". It is considered desirable that this time be shortened as much as possible and in addition that it not be accompanied with unnecessary vibration.

Among the techniques for trying to shorten the tact time for long pitch movement, conventionally (1) attempts to optimize the servo parameters, (2) attempts to optimize an acceleration and deceleration curve (hereinafter also referred to as an acceleration and deceleration pattern), and (3) attempts to optimize an acceleration and deceleration time Tp considering the actuator power (time from the acceleration start time t=0 to when the speed ω reaches a peak value $\omega_r$, hereinafter also referred to as a peak time Tp) have been investigated.

For example, as a method of optimization of the acceleration and deceleration curve with respect to the above-described (2), there has been the proposal made in Japanese Patent Application No. 2-283867 (Japanese Unexamined Patent Publication No. 4-157508). As a method of optimization of the acceleration and deceleration time considering the actuator power with respect to the above-described (3), there has been the proposal in U.S. Pat. No. 5,331,542.

To shorten the movement time for short pitch movement of about 50 mm or less, a technique of raising the frequency characteristic of a servo loop, a technique of simply inputting a step signal $\Delta\theta$ of an input position, a technique of adopting various cam curves for an instruction input, etc. have been used.

However, to raise the frequency characteristic of the servo loop, it is necessary to increase the speed of the computation time of the CPU and eliminate or moderate the resonance of the mechanical system in the robot, and therefore if suffers from the disadvantages in that the CPU becomes expensive and a long time is consumed for the attempts to eliminate or moderate the resonance of the mechanical system. Also, it suffers from the disadvantage in that the time for reaching the target position of $\Delta\theta$ becomes extremely long if merely a step signal $\Delta\theta$ of the input position is input to the servo circuit (in principle, an infinite time is required). Further, it suffers from the disadvantage in that, when various cam curves are adopted for the instruction input, a long time is required for the calculation of the related cam curve and the rising time becomes large in comparison with the eigen acceleration and deceleration time Tp in principle.

SUMMARY OF THE INVENTION

An object of the present invention is to provide method and apparatus of numerical control, enabling the control of the operation of an actuator with the shortest time and high efficiency for an operation of a short pitch.

According to the present invention, there is provided a numerical control method for controlling an operation of at least one actuator by a servo circuit having a certain characteristic, characterized in that an eigen value ($\beta$) by which an amount of movement up to an eigen acceleration and deceleration time (Tp) of the servo circuit becomes one-half of a target amount of movement ($\Delta\theta$) which is input and a step signal of a value ($\beta \cdot \Delta\theta$) obtained by multiplying this eigen value with the target amount of movement is input to the servo circuit, whereby the operation of the actuator during a time from at least the start of the operation to the eigen acceleration and deceleration time is controlled.

In this case, preferably the operation of the actuator caused by inputting the step signal of a value ($\beta \cdot \Delta\theta$) obtained by multiplying the eigen value with the target amount of movement is stored at a predetermined time interval, this stored information is folded back about the eigen acceleration and deceleration time (Tp) as a symmetrical axis to produce operation information, and the operation of the actuator after the eigen acceleration and deceleration time is controlled based on this operation information.

Also, after the eigen acceleration and deceleration time, the operation of the actuator can be controlled by inputting the step signal of the target amount of movement ($\Delta\theta$) to the servo circuit.

Also, according the present invention, there is provided a numerical control apparatus in which a position instruction signal is transmitted to a servo circuit having a certain characteristic from an instruction value generation unit based on the input target position information and a position information from a position detection unit detecting the movement position of the actuator and the operation of at least one actuator is controlled by this servo circuit, characterized in that provision is made of a detected position storage unit which stores the operation position information of the actuator detected by the position detection unit and a storage reading unit which reads the operation position information stored in the detection position storage unit by folding the same at a middle point of the route based on the signal from the instruction value generation unit and transmits the same to the servo circuit.

In this case, preferably the transmission signal from the instruction value generation unit is a step signal of a value ($\beta \cdot \Delta\theta$) obtained by multiplying with the target amount of movement an eigen value ($\beta$) found so that the amount of movement up to the eigen acceleration and deceleration time (Tp) of the servo circuit becomes one-half of the target amount of movement ($\Delta\theta$).

Also, the middle point of the route is the eigen acceleration and deceleration time (Tp) of the servo circuit, a point where the speed differential of the position information detected by the position detection unit becomes negative, or is calculated based on the target position information which is input.

Note that, it is also possible to control the operation of the actuator by an arbitrary movement time of 2Tp or more irrespective of the input target position information.

When the characteristic of the servo system is determined, the minimum acceleration and deceleration time Tp with respect to the target amount of movement $\Delta\theta$ is determined unconditionally and also an eigen value $\beta$ whereby the amount of movement up to t=Tp becomes one-half of the target amount of movement is determined unconditionally.

In the present invention, attention is paid to this point. An eigen value $\beta$ whereby the amount of movement until t=Tp becomes one-half of the target amount of movement is found, and a step signal of a value β·Δθ obtained by multiplying this with the target amount of movement is input to the servo loop. By this, the operation of the actuator at the rising time up to t=Tp is controlled. Accordingly, the actuator can be controlled by the value of the limit of capability of the servo loop without a need for complex calculation in the CPU, and so a short tact time in a short pitch operation can be realized.

On the other hand, after t=Tp, the pattern of the actual operation of the actuator produced by inputting this step signal β·Δθ is stored. This pattern is found by folding the stored operation pattern at t=Tp. The operation of the actuator is controlled based on this position information (hereinafter also referred to as the step-exponential method). In this technique, the position instruction signal after t=Tp can be produced by just reading the stored information of the storage unit, and therefore it is not necessary to perform a complex calculation in the CPU and the sampling time of the stored information and the position instruction calculation interval of the servo loop coincide, which is ideal for control.

Moreover, as the control method after t=Tp, in addition to the above-mentioned step-exponential method, it is also possible to control the operation of the actuator by inputting a step signal of the target amount of movement Δθ to the servo circuit (hereinafter also referred to as a step-step method). In this case, an error Δβ of the eigen value β possessed by the step-exponential method is not included. Therefore, this method is effective as an actual control method.

As the middle point of the route in the step-exponential method, step-step method, or the like, other than the usage of the eigen acceleration and deceleration time Tp, it is also possible if the speed is found by differentiating actual position information detected by the position detection unit (encoder) and if the point at which this speed differential is changed from positive to negative is defined as the middle point of the route. Alternatively, it is also possible to find the same by simply multiplying the target position information Δθ to be input with for example one-half.

Further, while it can be said that the present invention is suitable for a short pitch operation, the present invention can be applied also to a case where the movement time is intentionally made longer or variable. Namely, concerning override, it is sufficient if the position instruction of an acceleration part and a deceleration part is produced by the above-mentioned procedure and a part between them is processed as a low speed part.

BRIEF DESCRIPTION OF THE DRAWINGS

These and other objects and features of the present invention will become more apparent from the following more detailed description of the preferred embodiments with reference to the accompanying drawings, in which.

DESCRIPTION OF THE PREFERRED EMBODIMENTS

First of all, the principle of the present invention will be explained in the sections items referring to the figures.

Principle of the present invention (1) Regarding eigen acceleration and deceleration time Tp (1-1) Tp of third order servo loop (1-2) Relationship between servo parameter and servo frequency-characteristic (1-3) Relationship between Tp and servo frequency-characteristic (2) Regarding position instruction input processing of step-exponential method (2-1) Position instruction algorithm (2-2) Long pitch movement and ramp-exponential method (2-3) Step-step method (2-4) Step-exponential method and override (3) Error in step-exponential method (3-1) Precision of $\beta$ and $\delta(Tp)$ (3-2) Detection error of speed peak point t=Tp (3-3) Difference of servo frequency-characteristic of respective axes (4) Correction of error in step-exponential method (4-1) Correction method of $\beta$ and $\delta(Tp)$ error (4-2) Correction method of detection error of speed peak point t=Tp (1) Regarding eigen acceleration and deceleration time Tp First, since the present invention is a numerical control method utilizing a step response time Tp to the servo loop, an explanation will be made of this Tp.

(1-1) Tp of servo loop of third order

Figure 2:
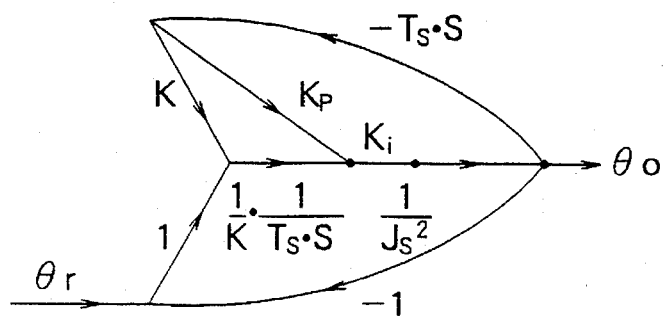
FIG. 2 is a line drawing of the signal flow showing a servo loop according to the present invention.

As shown in FIG. 2, the principle of the present invention will be explained using a third order servo loop as an example, but the following explanation should not be construed as losing its general nature. The principle of the present invention may similarly applied even if the servo loop is a fourth order or higher loop.

The parameters in FIG. 2 are as shown in the figure. The output function $\theta_o(S)$ of this third order system servo loop is expressed as the following equation 1-1 when defining the input instruction function as $\theta_r(S)$.

$$\theta_o(S) = \frac{1}{1 + T_a \cdot K \cdot S + T_a^2 \cdot K_F K S^2 + \frac{JKT_a}{K_i}S^2} \cdot \theta_r(S) \quad (1-1)$$

The output function $\theta_o(S)$ of this third order servo loop is defined as in the following equation 1-2 using the time constants $T_1$, $T_2$, and $T_3$.

$$\theta_o(S) \stackrel{\Delta}{=} \frac{1}{(1+T_1S)(1+T_2S)(1+T_3S)} \cdot \theta_r(S) \quad (1-2)$$

Here, when the step signal $\beta \cdot \Delta\theta$ is input to the input instruction function $\theta_o(S)$, equation 1-2 can be expressed the following equation 1-3.

$$\theta_o(S) = \frac{1}{(1+T_1S)(1+T_2S)(1+T_3S)} \cdot \frac{\beta\Delta\theta}{S} \quad (1-3)$$

When this equation 1-3 is subjected to a Laplace inverse transformation, it can be expressed as the following equation 1-4 for the position output, speed output, and acceleration degree output.

$$\begin{cases} \theta_o(t) = \beta\Delta\theta \left\{ 1 - \frac{T_1^2}{(T_1-T_2)(T_1-T_3)} e^{-\frac{t}{T_1}} - \frac{T_2^2}{(T_2-T_1)(T_2-T_3)} e^{-\frac{t}{T_2}} - \frac{T_3^2}{(T_3-T_2)(T_3-T_1)} e^{-\frac{t}{T_3}} \right\} \\ \dot\theta_o(t) = \beta\Delta\theta \left\{ \frac{T_1}{(T_1-T_2)(T_1-T_3)} e^{-\frac{t}{T_1}} - \frac{T_2}{(T_2-T_1)(T_2-T_3)} e^{-\frac{t}{T_2}} - \frac{T_3}{(T_3-T_2)(T_3-T_1)} e^{-\frac{t}{T_3}} \right\} \\ \ddot\theta_o(t) = \beta\Delta\theta \left\{ -\frac{1}{(T_1-T_2)(T_1-T_3)} e^{-\frac{t}{T_1}} - \frac{1}{(T_2-T_1)(T_2-T_3)} e^{-\frac{t}{T_2}} - \frac{1}{(T_3-T_2)(T_3-T_1)} e^{-\frac{t}{T_3}} \right\} \end{cases} \quad (1-4)$$

Figure 3:
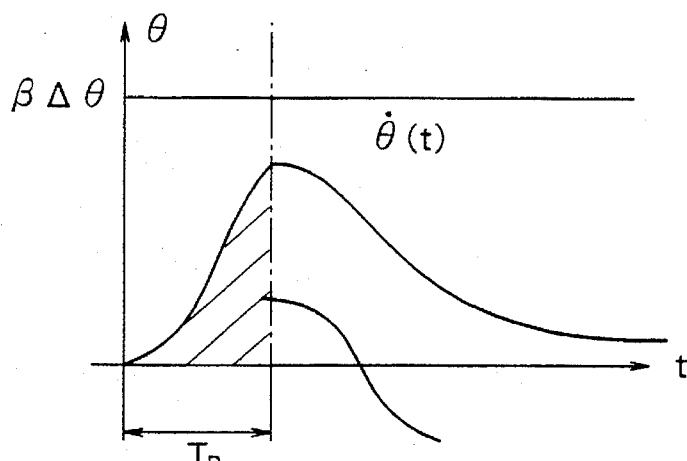
FIG. 3 is a graph of a position output/speed output when a step signal having a magnitude of βΔθ is input as a position instruction to the servo loop of FIG. 2.

When this circumstance, that is, the position output and speed output when the step signal $\beta\cdot\Delta\theta$ is in input to the above-mentioned third order servo loop is illustrated, it becomes as in FIG. 3. The point which should be noted here is that the time Tp at which the speed output reaches the peak is always constant irrespective of the target amount of movement $\Delta\theta$. In other words, if the time constants $T_1$, $T_2$, and $T_3$ are determined, that is, if the servo parameters Kp, K, and Ki are determined, this can be said to be the unconditionally determined eigen amount of the related servo loop. The time Tp at which the speed output reaches the peak can be found by solving the following equation 1-5 in the equation 1-4:

$$\dot\theta_o(t_v)=0 \quad (1-5)$$

Note that, if equation 1—1 and equation 1-2 are used, as in the following equation 1-6, the relationships among the servo parameters p, K, and Ki and the time constants $T_1$, $T_2$, and $T_3$ become clear.

$$\begin{cases} K_p = \frac{T_1T_2 + T_2T_3 + T_3T_1}{T_1+T_2+T_3} \cdot \frac{1}{T_a} \\ \frac{K_i}{J} = \frac{T_1+T_2+T_3}{T_1T_2T_3} \\ K = (T_1+T_2+T_3) \cdot \frac{1}{T_a} \end{cases} \quad (1-6)$$

(1-2) Relationships between servo parameters and servo frequency characteristic

Next, the relationships among the servo parameters Kp, K, and Ki and the servo frequency-characteristics (0 dB cut frequency $f_0$ or $T_0=1/f_0$) are found. It is assumed that the target characteristic (transfer function) of the third order servo loop mentioned above is given as in the following equation 1-7:

$$\begin{cases} \overline{G_{OP}}(\overline{S}) = \frac{\overline{a}}{\overline{S}} + \frac{\overline{b}}{\overline{S}^2} + \frac{\overline{c}}{\overline{S}^3} \\ \overline{S} = \frac{S}{\omega_c} \quad (\omega_c \text{ In}|\overline{G_{OP}}(\overline{S})| = \text{frequency making } \overline{a}) \end{cases} \quad (1-7)$$

In this case, the coefficients a, b, and c (each given a bar above them) can be determined in accordance with the target characteristic, but since equation 1-7 is a third order, if the following is selected according to the coefficient of a Butterworth polynomial:

$$\begin{cases} \overline{a} = 2 \\ \overline{b} = 2 \quad \text{(a Butterworth characteristic)} \\ \overline{c} = 1 \end{cases} \quad (1-8)$$

a Butterworth characteristic without overshoot is obtained. Moreover, it is also possible to obtain various characteristics by a slight shift from these values.

Note that, the coefficient of a Butterworth polynomial is disclosed on pp. 269 to 276 of "Gazo Denshi Kairo (Image Electronic Circuits)" (first edition) edited by the Television Society and published by Corona Ltd.

When equation 1-8 is substituted in equation 1-7, the following equation 1-9 is obtained:

$$\overline{G_{OP}} = \frac{\overline{a}\omega_e}{S} + \frac{\overline{b}\omega_e^2}{S^2} + \frac{\overline{c}\omega_e^3}{S^3} \quad (1-9)$$

On the other hand, a loop open characteristic $G_{OP}(S)$ is expressed by the following equation 1–10:

$$G_{OP}(S) = \frac{K_i K_p T_3 / J}{S} + \frac{K_i / J}{S^2} + \frac{\frac{K_i}{T_a \cdot K \cdot J}}{S^2} \quad (1\text{-}10)$$

When comparing the second terms from this and equation 1–9, the following is obtained:

$$\begin{cases} \dfrac{T_3 \cdot K_i \cdot K_p}{J} = \bar{a} \omega_c \\ \dfrac{K_i}{J} = \bar{b} \omega_c^2 \\ \dfrac{K_i}{T_3 \cdot K \cdot J} = \bar{c} \omega_c^3 \end{cases} \quad (1\text{-}11)$$

The relationship between the corner frequency (−3 dB frequency) $\omega_c$ and 0 dB cut frequency $\omega_o$ is:

$$\begin{cases} \omega_c = \bar{a} \cdot \omega_c \\ \omega_0 = 2\pi \dfrac{1}{T_3} \end{cases} \quad (1\text{-}12)$$

and therefore if equation 1–11 is solved using this equation 1–12, the following equation 1–13 is obtained:

$$\begin{cases} K_p = \dfrac{1}{2\pi} \dfrac{\bar{a}}{\bar{b}} \dfrac{T_o}{T_3} \\ \dfrac{K_i}{J} = (2\pi)^2 \dfrac{\bar{b}}{\bar{a}^3} \dfrac{1}{T_o^2} \\ K = \dfrac{1}{2\pi} \dfrac{\bar{a} \cdot \bar{b}}{\bar{c}} \dfrac{T_o}{T_2} \end{cases} \quad (1\text{-}13)$$

In this case, when it is assumed that the target characteristic is the Butterworth characteristic, from equation 1–8, the following is obtained:

$$\begin{cases} K_p = \dfrac{1}{2\pi} \dfrac{T_o}{T_3} \\ \dfrac{K_i}{J} = 2\pi^2 \dfrac{1}{T_o^2} \\ K = \dfrac{2}{\pi} \dfrac{T_o}{T_3} \end{cases} \quad (1\text{-}14)$$

(1–3) Relationship between Tp and servo frequency-characteristic $T_o$

As already mentioned, Tp is the time of arrival up to the peak value of the speed output with respect to the input of the step signal and is an eigen value of the servo loop irrespective of the magnitude of the input of the step signal. As the input, there is no input faster than the input of the step signal, and therefore it can be said that Tp is the minimum rising time of the servo loop.

Figure 4:
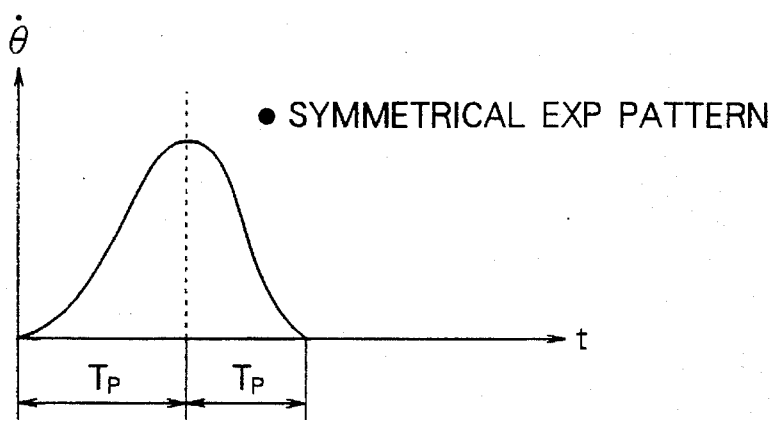
FIG. 4 is a graph of an ideal acceleration and deceleration curve in the servo loop of FIG. 2.

If energy dissipation such as friction can be ignored, the minimum movement time where this servo loop system is made to perform a PTP (point to point) operation of a smooth stoppage, that is, the minimum tack, will be 2Tp as shown in FIG. 4. Therefore, if the relationship between the servo loop frequency-characteristic and Tp is known, when the desired specification of the tact is determined, which degree of servo frequency-characteristic is needed can be decided conversely. For this reason, when the relationship between the servo loop frequency-characteristic and Tp is investigated, from equation 1–6 and equation 1–13, it becomes:

$$\begin{cases} K_p = \dfrac{T_1 T_2 + T_2 T_3 + T_3 T_1}{T_1 + T_2 + T_3} \dfrac{1}{T_3} = \dfrac{1}{2\pi} \dfrac{\bar{a}}{\bar{b}} \dfrac{T_o}{T_3} \\ \dfrac{K_i}{J} = \dfrac{T_1 + T_2 + T_3}{T_1 \cdot T_2 \cdot T_3} = (2\pi)^2 \dfrac{\bar{b}}{\bar{a}^3} \dfrac{1}{T_o^2} \\ K = (T_1 + T_2 + T_3) \dfrac{1}{T_3} = \dfrac{1}{3\pi} \dfrac{\bar{a} \cdot \bar{b}}{\bar{c}} \dfrac{T_o}{T_3} \end{cases} \quad (1\text{-}15)$$

Accordingly, the following is obtained:

$$\begin{cases} T_1 + T_2 + T_3 = \dfrac{1}{2\pi} \dfrac{\bar{a} \cdot \bar{b}}{\bar{c}} T_o \\ T_1 \cdot T_2 \cdot T_3 = \dfrac{1}{\bar{c}} \left( \dfrac{\bar{a}}{2\pi} T_o \right)^3 \\ T_1 T_2 + T_2 T_3 + T_3 T_1 = \dfrac{1}{\bar{c}} \left( \dfrac{\bar{a}}{2\pi} T_o \right)^2 \end{cases} \quad (1\text{-}16)$$

By finding the time constants $T_1$, $T_2$, and $T_3$ of equation 1–16, Tp is obtained, but as is clear from this equation, the time constant $T_i$ (i=1 to 3) is a solution of the next third order equation:

$$(t - T_1)(t - T_2)(t - T_3) = \quad (1\text{-}17)$$

$$t^2 - (T_1 + T_2 + T_3)t^2 + (T_1 T_2 + T_2 T_3 + T_3 T_1)t -$$

$$T_1 \cdot T_2 \cdot T_3 = t^2 - \dfrac{1}{2\pi} \dfrac{\bar{a} \cdot \bar{b}}{\bar{c}} T_o t^2 +$$

$$\dfrac{1}{\bar{c}} \left( \dfrac{\bar{a}}{2\pi} T_o \right)^2 t - \dfrac{1}{\bar{c}} \left( \dfrac{\bar{a}}{2\pi} T_o \right)^3 = 0$$

equation 1–9, which is an ideal target characteristic of the servo loop, is determined according to the target specification, the mechanical system of the robot, the condition of the actuator, etc. However, it is generally considered ideal if the Butterworth characteristic is one by which a dynamic range input to the actuator is sufficiently large, that is, one which is absolutely stable and satisfies a circle condition under a condition that the actuator input is not saturated (that is, overshoot will not occur). Note, as an actual characteristic, it is also possible even if the characteristic is slightly finely adjusted from this Butterworth characteristic, but theoretically no problem is caused by the Butterworth characteristic.

Therefore, by using the Butterworth characteristic as the ideal characteristic, the relationship between Tp and $T_0$ is obtained.

From equation 1–8, equation 1–17 is rewritten as follows:

$$t^3 - \dfrac{2}{\pi} T_o t^2 + 2 \left( \dfrac{T_o}{\pi} \right)^2 t - \left( \dfrac{T_o}{\pi} \right)^3 = 0 \quad (1\text{-}17')$$

When this is subjected to factor analysis, it becomes:

$$\left(t - \frac{T_o}{\pi}\right)\left(t - \frac{1+j3}{2} \frac{T_o}{\pi}\right)\left(t + \frac{1-j3}{2} \frac{T_o}{\pi}\right) = 0 \quad (1\text{-}17'')$$

Accordingly, the following is obtained:

$$\begin{cases} T_1 = \dfrac{T_0}{\pi} \\[6pt] T_2 = \dfrac{1+j3}{2} \dfrac{T_0}{\pi} \stackrel{\Delta}{=} (a+jb)T_1 \stackrel{\Delta}{=} \alpha T_2 \\[6pt] T_3 = \dfrac{1-j3}{2} \dfrac{T_0}{\pi} \stackrel{\Delta}{=} (a-jb)T_1 \stackrel{\Delta}{=} \bar{\alpha}T_1 \end{cases} \quad (1\text{-}18)$$

and simultaneously coefficients $\alpha$ and $\alpha$ bar are defined as in equation 1-18.

Incidentally, it should be noted that $-1/T_1$, $-1/T_2$, and $-1/T_3$ are poles of equation 1-2.

Next, when equation 1-18 is substituted in equation 1-4 and equation 1-5, the following equation 1-19 is obtained:

$$\begin{cases} \dfrac{e^{\tau_P}}{(1-\alpha)(1-\bar{\alpha})} + \dfrac{e^{\frac{\tau_P}{\alpha}}}{(1-\alpha)(\alpha-\bar{\alpha})} - \dfrac{e^{\frac{\tau_P}{\bar{\alpha}}}}{(1-\bar{\alpha})(\alpha-\bar{\alpha})} = 0 \\[6pt] \text{where, } \tau_P = \dfrac{T_P}{T_1} \end{cases} \quad (1\text{-}19)$$

When this equation 1-19 is cleaned up, the result is:

$$-e^{\tau_P} + \frac{1-\bar{\alpha}}{\alpha-\bar{\alpha}} e^{\frac{\tau_P}{\alpha}} - \frac{1-\alpha}{\alpha-\bar{\alpha}} e^{\frac{\tau_P}{\bar{\alpha}}} = 0 \quad (1\text{-}20)$$

but the second term on the left side can be modified as in equation 1-21, and the third term on the left side can be modified as in equation 1-22.

$$\frac{1-\bar{\alpha}}{\alpha-\bar{\alpha}} e^{\frac{\tau_P}{\alpha}} = \frac{1-(a-jb)}{a+jb-(a-jb)} e^{\frac{\tau_P}{\alpha}} = \quad (1\text{-}21)$$

$$\frac{1-a+jb}{2jb} e^{\frac{\tau_P}{a+jb}} = -\frac{-b+j(1-a)}{2b} e^{\frac{(a-jb)\tau_P}{a^2+b^2}} =$$

$$\frac{b-j(1-a)}{2b} e^{\frac{a\tau_P}{a^2+b^2}} \cdot e^{\frac{-jb\tau_P}{a^2+b^2}}$$

$$\frac{1-\alpha}{\alpha-\bar{\alpha}} e^{\frac{\tau_P}{\bar{\alpha}}} = \frac{1-(a+jb)}{a+jb-(a-jb)} e^{\frac{\tau_P}{\alpha-jb}} = \quad (1\text{-}22)$$

$$\frac{1-a-jb}{2jb} e^{\frac{a+jb}{a^2+b^2}\tau_P} =$$

$$\frac{-b-j(1-a)}{2b} e^{\frac{a\tau_P}{a^2+b^2}} \cdot e^{\frac{jb\tau_P}{a^2+b^2}}$$

When this is substituted in equation 1-20, the result is:

$$e^{\tau_P} = \quad (1\text{-}23)$$

$$e^{\frac{a\tau_P}{a^2+b^2}} \left\{ \frac{b-j(1-a)}{2b} e^{\frac{-jb\tau_P}{a^2+b^2}} + \frac{b+j(1-a)}{2b} e^{\frac{jb\tau_P}{a^2+b^2}} \right\} =$$

$$\frac{1}{2b} e^{\frac{a\tau_P}{a^2+b^2}} \{ \sqrt{b^2+(1-a)^2}\, e^{j\phi} \cdot e^{\frac{-jb\tau_P}{a^2+b^2}} +$$

$$\sqrt{b^2+(1-a)^2}\, e^{j\phi} \cdot e^{\frac{jb\tau_P}{a^2+b^2}} \} = \frac{\sqrt{b^2+(1-a)^2}}{2b} \cdot$$

$$e^{\frac{a\tau_P}{a^2+b^2}} \left\{ e^{j\left(\frac{b\tau_P}{a^2+b^2}-\phi\right)} + e^{-j\left(\frac{b\tau_P}{a^2+b^2}-\phi\right)} \right\} =$$

-continued $$\frac{\sqrt{b^2+(1-a)^2}}{2b} \cdot e^{\frac{a\tau_P}{a^2+b^2}} \cdot 2 \cdot \cos\left(\frac{b}{a^2+b^2}\tau_P - \phi\right)$$

Namely, $$\begin{cases} e^{\tau_P} = \dfrac{\sqrt{b^2+(1-a)^2}}{2b} \cdot e^{\frac{a\tau_P}{a^2+b^2}} \cdot z \cdot \\[6pt] \cos\left(\dfrac{b}{a^2+b^2}\tau_P - \phi\right) \\[6pt] \tan\phi = \dfrac{1-a}{b} \end{cases}$$

when it is cleaned up for $\tau_p$, the result is:

$$\therefore -\tau_P = \quad (1\text{-}24)$$

$$\ln\left\{ \frac{\sqrt{b^2+(1-a)^2}}{b} \cdot \cos\left(\frac{b\cdot\tau_P}{a^2+b^2} - \phi\right) \right\} - \frac{a\cdot\tau_P}{a^2+b^2}$$

$$\therefore \left(\frac{a}{a^2+b^2} - 1\right)\tau_P = \ln\frac{\sqrt{b^2+(1-a)^2}}{b} +$$

$$\ln\left\{ \cos\left(\frac{b\cdot\tau_P}{a^2+b^2} - \phi\right) \right\}$$

By substituting $a=\frac{1}{2}$ and $b=\frac{3}{2}$ in this equation 1-24, the equation for $\tau_p$ is obtained:

$$0.8\tau_P = \ln\frac{\sqrt{10}}{3} + \ln\left\{ \cos\left(\frac{3}{5}\tau_P - 0.3217505\right) \right\} \quad (1\text{-}25)$$

$$\therefore 0.8\tau_P + \ln\{\cos(0.6\tau_P - 0.3217505)\} + 0.526802 = 0$$

$$\tau_P = \frac{T_P}{T_1} = \pi\frac{T_P}{T_0} = 3.012 \quad (1\text{-}26)$$

$$\therefore \begin{cases} 2T_P = 2\cdot 3.012 \cdot \dfrac{T_o}{\pi} \approx 1.92 \cdot T_o \\[6pt] \text{or} \\[6pt] T_o = 0.52 \cdot 2T_P \end{cases} \quad (1\text{-}27)$$

this is the relationship between $T_o$ and $2T_p$.

Accordingly, when an intended tact $2T_p$ is given, it can be estimated at least which degree of the servo loop frequency-characteristic ($T_o$) is necessary.

Note that, "at least" is due to that fact that the prerequisite for deriving equation 1-27 is that the instruction value is input by a step signal. Namely, this is because it is not always necessary to input the step signal as the instruction value. It is also possible to use for example a triangle, synthetic sin, exponential and the other acceleration and deceleration patterns, and a servo delay is caused with these inputs. In actuality, it can be said that it is more preferable if about double the margin is ensured.

For example, where a tact 0.2 sec is necessary, it becomes $T_o=0.52\times 0.2=0.104$ sec from equation 1-27, and accordingly $f_o=1/T_o=9.6$ Hz is obtained. When it is assumed that double the margin is ensured, in the end 19 Hz or more becomes necessary as the frequency-characteristic of the servo loop.

Note that, where the relationship of $T_p$ and $T_o$ in the other characteristics is desired to be known, it is sufficient if concrete values of the coefficients of those characteristics, the a bar, b bar, and the c bar, are substituted in equation 1-17 to obtain equation 1-17' and the procedures as described above are followed.

(2) Regarding position instruction input processing of step-exponential method

Next, the step-exponential method of the numerical control method according to the present invention will be explained. According to the present method, the rising time until the speed reaches the peak is the same as the rising time Tp inherent in the servo loop and becomes the optimum. Also, there is almost no need for the calculation of instruction values usually performed by a host computer—which is complex and requires a long time—as in the conventional method. Further, the calculation interval of the instruction value (sampling time $T_{RS}$) must be set as $T_{SS} \ll T_{RS}$ due to the computing power of the usual CPU, but according to the present method, it can be made the same as the sampling time $T_{SS}$ of the servo circuit, that is, $T_{RS}$ can be made equal to $T_{SS}$ and therefore is ideal. From this, it is suitable for particularly short pitch and short tact specifications.

(2-1) Position instruction algorithm

Below, an explanation will be made of the position instruction algorithm of the present invention. In the PTP operation explained here, it is assumed that the amount of movement is $\Delta\theta$ and the value of $\beta$ is stored on the host computer side. Also, due to the short pitch, the peak speed of the motor is the highest speed of the motor or less and there is an acceleration and deceleration curve of the exponential type. Further, the servo side can deal only with integers, and the calculation interval of the instruction value (sampling time) $T_{RS}$ and the sampling time $T_{SS}$ of the servo circuit are defined as $T_{SS} \ll T_{RS}$.

Figure 5:
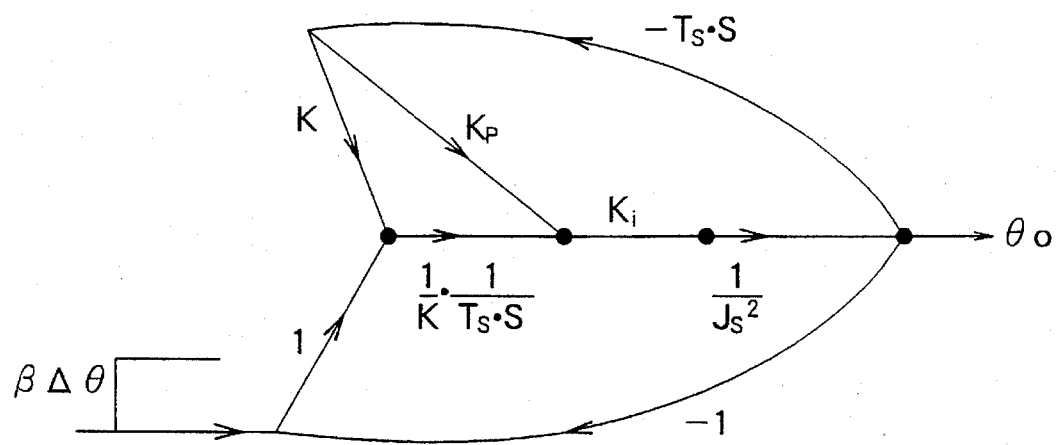
FIG. 5 is a line drawing of a signal flow a step signal of βΔθ is input to the servo loop according to the present invention.
Figure 6A:
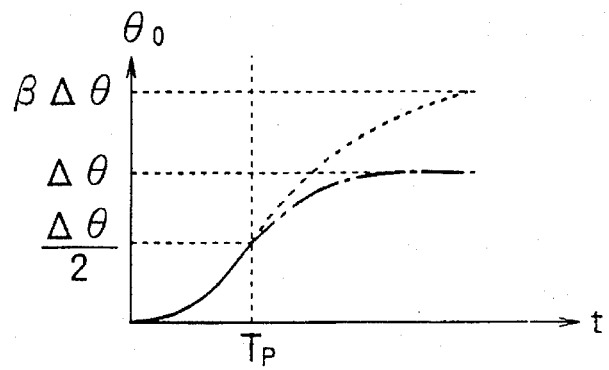
FIGS. 6A and 6B are graphs of the position output/speed output explaining the position instruction input processing of a step-exp method according to the present invention.
Figure 6B:
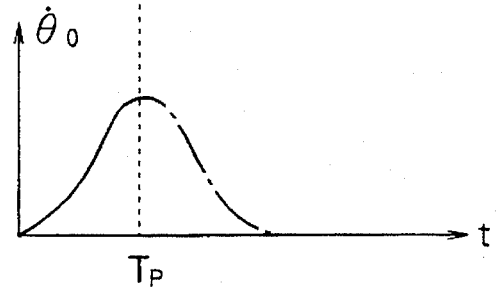

From the above assumption, first, the host computer transmits the amount of movement $\Delta\theta$ and $\beta \cdot \Delta\theta$ (integer) to the servo CPU before the start of the PTP operation. The host computer basically only performs this operation, and accordingly the operation can be made extremely simple. On the servo side receiving the transmission of this data, the received $\beta \cdot \Delta\theta$ is input to the position instruction of the servo loop at every sampling time $T_{SS}$ of the servo circuit as shown in FIG. 5. By this, the motor starts the operation at a position and with a speed as shown in FIG. 6. At this time, the servo side reads out the $\theta_o$ of the output of an encoder (position detection unit) at every sampling time $T_{SS}$ of the servo circuit and stores this value in the memory (detected position storage unit). In parallel with this storage operation, the servo side calculates the speed differential $\dot{\theta}$ using the encoder output and monitors an increase or decrease of this speed differential, that is, the peak point.

When the speed differential $\dot{\theta}$ decreases (becomes negative), it means that the peak point is detected, and therefore thereafter the instruction value is calculated from $\Delta\theta$ and the information of the memory and this is input to the servo loop. This situation is indicated by a one dot chain line of FIG. 6. The position pattern which has been stored in the memory is obtained by sampling the motion of the motor and load (arm) per se at every sampling time $T_{SS}$ of the servo circuit, and therefore it can be said that this is the most ideal curve in the third order exponential pattern. In addition, it can be obtained without any calculation and merely by reading the position information from the memory.

Figure 7:
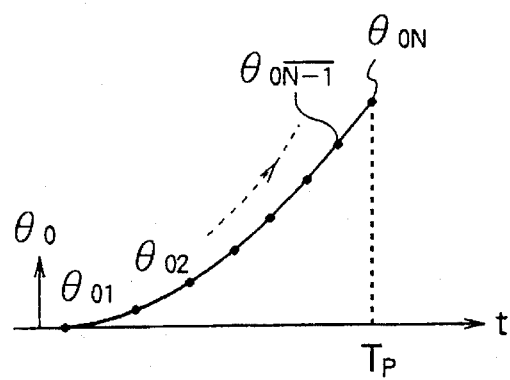
FIG. 7 is a graph of the position output for explaining the position instruction input processing of the step-exp method according to the present invention in the same way as the above.
Figures 8, 9:
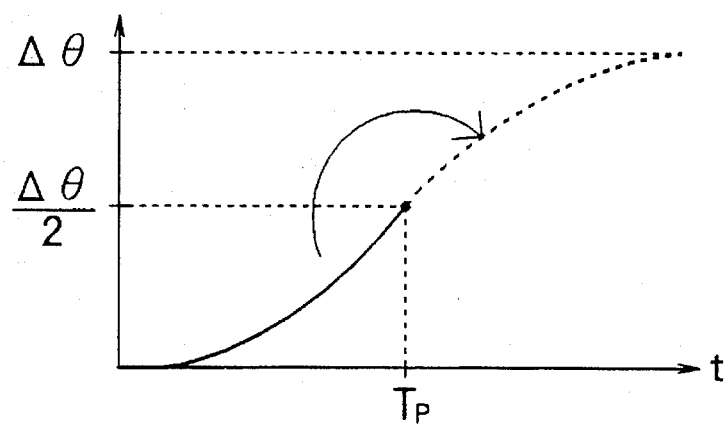
FIG. 8 is a graph of the format for recording information in a detection position storage unit according to the present invention.
FIG. 9 is a graph of the position output for explaining a step of making the stored information in the storage reading unit symmetrical according to the present invention.

The production of the instruction value after the time Tp until the peak speed is reached is carried out in the following way. First, when it is assumed that the pattern shown in FIG. 7 is stored in the memory, after t=Tp, the servo input instruction value $\theta_1$ (Tp+nTss) shown in FIG. 8 is calculated at every sampling time $T_{SS}$ of the servo circuit. By this servo input instruction value $\theta_i$, as shown in FIG. 9, a pattern rotated by 180° about the point (Tp, $\theta_{ON}$) of FIG. 7 as the center will be prepared.

Note that, an ideal circumstance is assumed in the above explanation, but in reality there may be problems such as a case where Tp/$T_{SS}$ is not an integer, a case where the eigen amount $\beta$ is not strictly known, etc. If a pattern information before t=Tp is used for the pattern after t=Tp due to such problems, there is a concern that a slight step difference will be caused in n=1 and n=N. However, no large problems have been pointed out even if a triangular acceleration and deceleration pattern is used. In addition, there should be no problem in the operation of the motor due to the filtering effect of the servo circuit.

Figure 10:
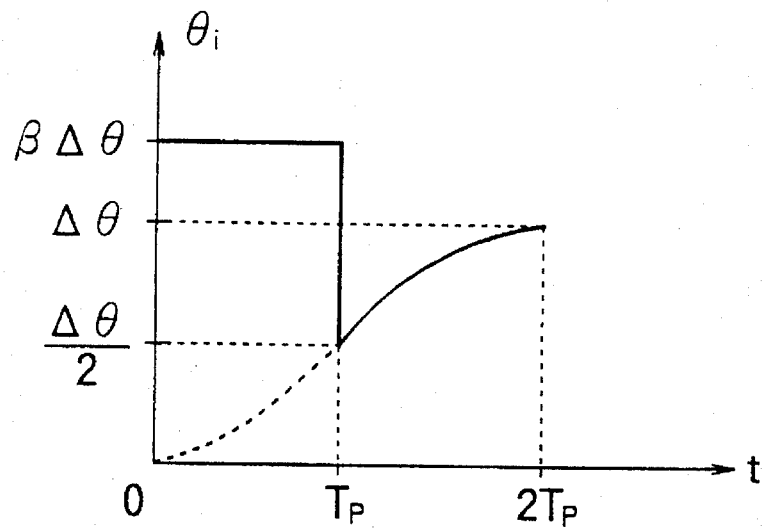
FIG. 10 is a graph of the position output in the step-exp method according to the present invention.

The above description was of the step-exponential method according to the present invention, which was illustrated as in FIG. 10. As already mentioned, $\beta$ is the eigen amount of the servo loop characteristic and is a value with which a distance of movement up to the time Tp when the step signal of $\beta \cdot \Delta\theta$ is input becomes $\Delta\theta/2$. Next, the position information until $0 \leq t \leq Tp$ is stored in the memory. When $Tp \leq t \leq 2Tp$, the position information is produced on the servo side based on the stored position information.

(2-2) Long pitch movement and ramp-exponential method

In the above-mentioned step-exponential method, the position step input is input to the servo loop, and therefore when the value $\beta \cdot \Delta\theta$ of this step signal becomes large, also the motor current becomes large and there is a concern that it will exceed the peak current of the motor.

For this reason, preferably the following ramp-exponential method is used for example for long pitch movement. Note, the basic concept and algorithm of the ramp-exponential method are the same as the step-exponential method, and therefore a detailed explanation is partially omitted here by showing the situation of the position instruction corresponding to FIG. 10 in FIG. 11.

Figure 11:
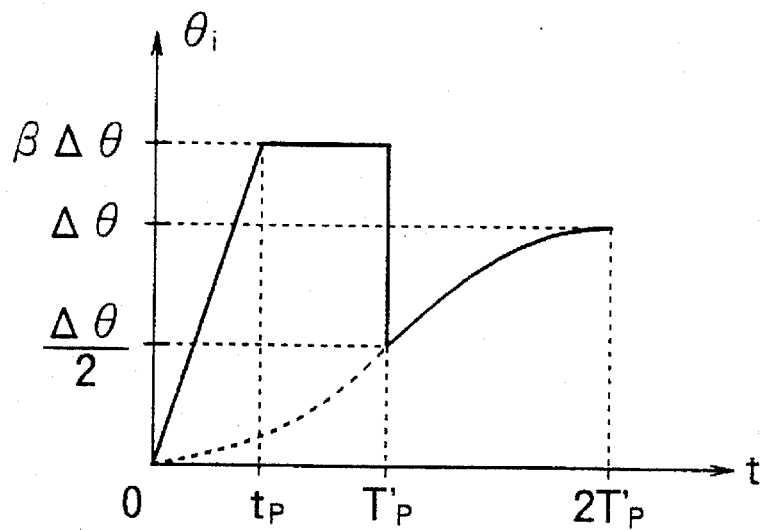
FIG. 11 is a graph of the position output in a ramp-exp method according to another embodiment of the present invention.
Figure 12:
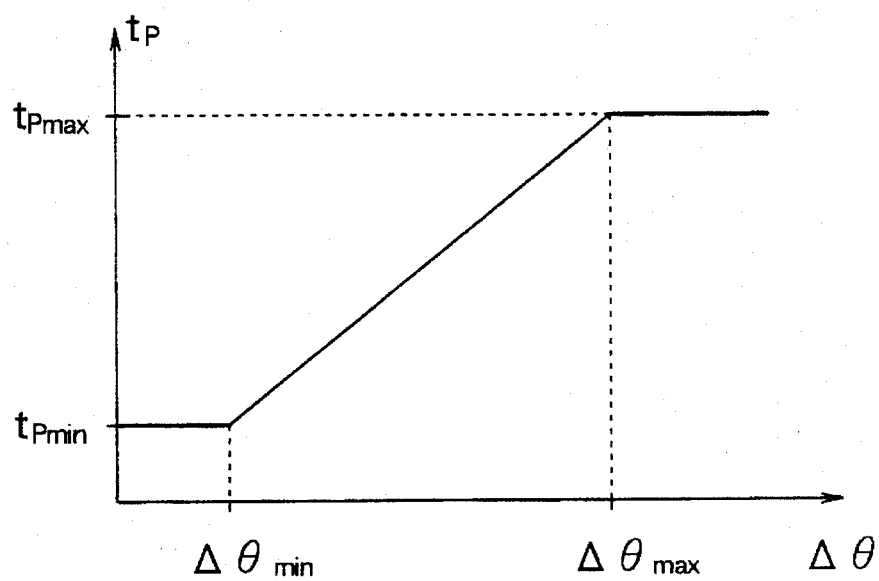
FIG. 12 is a graph of a relationship between a ramp rising time tp and an amount of movement Δθ in an embodiment shown in FIG. 11.

As shown in FIG. 11, the period until the rising time, i.e., $0 \leq t \leq tp$, is raised by a so-called ramp, but this ramp time tp is made to fluctuate in accordance with the movement distance so as to prevent the motor peak current from being exceeded. It is also possible to theoretically determine the ramp rising time tp, but desirably it is actually determined by collecting the data using $\Delta\theta$ as the parameter. In this case, desirably a system is formed so that it can be determined by inputting the $\Delta\theta$-tp characteristics as shown in FIG. 12, for example a point ($\Delta\theta_{min}$, $tp_{min}$) and a point ($\Delta\theta_{max}$, $tp_{max}$) in FIG. 12 are input from a teaching pendant.

(2-3) Step-step method

Figure 13:
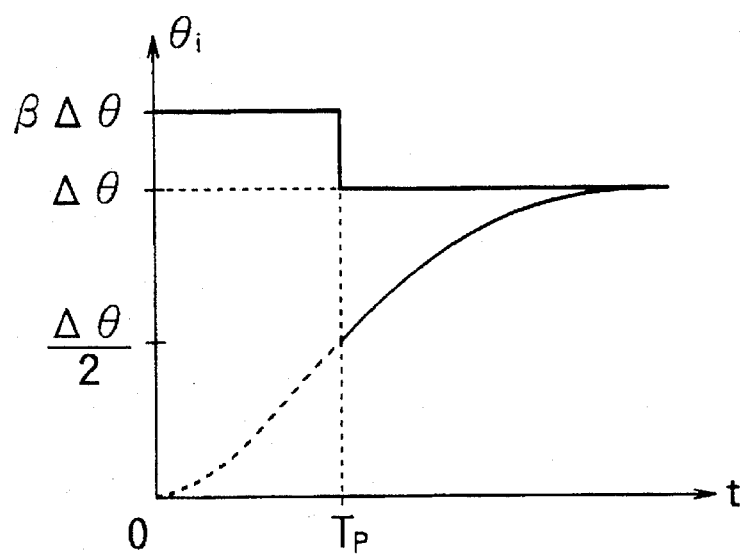
FIG. 13 is a graph of the position output in a step-step method according to still another embodiment of the present invention.

Strictly speaking, the step-exponential method includes a problem concerning error mentioned later, and therefore really it is also possible to input the step signal of the target amount of movement $\Delta\theta$ for the operation after t=Tp as shown in FIG. 13.

(2-4) Step-exponential method and override

As already mentioned, the step-exponential method according to the present invention is a preferred numerical control method for achieving a short tact with respect to short pitch movement, but where there is a request for override that can make the movement time variable, this can be processed by the following algorithm:

Note that, the symbols used in the following explanation are as follows:

$\Delta\theta$: Movement distance

2Tp: Movement time (Tp is an eigen time of the servo loop)

$\beta$: Value with which the distance of movement from t =0 to t=Tp when the step signal of $\beta \cdot \Delta\theta$ is input to the servo loop becomes $\Delta\theta/2$ and an eigen amount of the servo loop (already known)

$T_{RS}$: Acceleration and deceleration calculation cycle of the host CPU (sampling time)

$T_{ss}$: Sampling time of the servo CPU

P: Override (%)

$\omega_p$: Peak speed of the motor operating by the step-exponential method (speed when t=Tp)

$\delta(Tp)$: Constant satisfying $\Delta\theta=\delta(Tp)\cdot\omega_p$, and an eigen amount of the servo loop (already known)

First, the following processing is carried out in the host computer. Namely, when the movement time is multiplied by the override P, the following equation 2-1 is obtained:

$$2\cdot T_P / \frac{P}{100} = 100 \cdot \frac{2\cdot T_P}{P} \quad (2\text{-}1)$$

Figure 14:
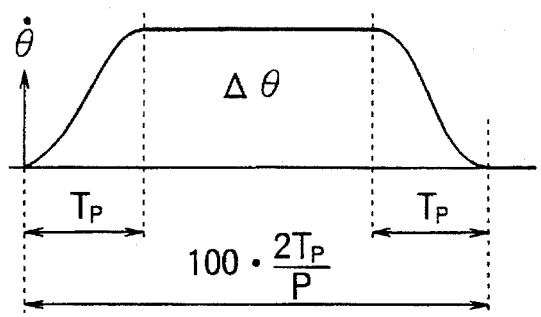
FIG. 14 is a view for explaining the relationship between the step-exp method and an override according to the present invention.
Figure 14:
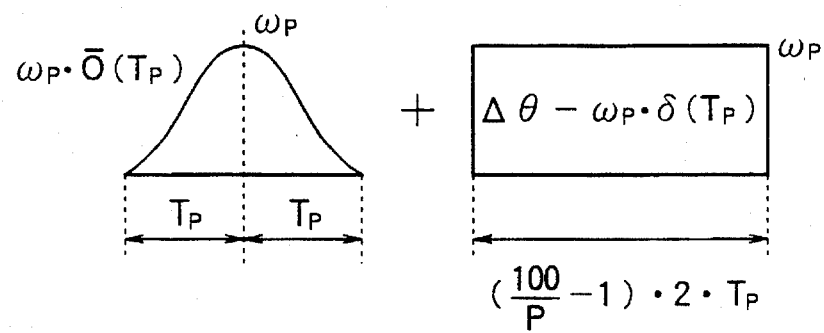

The acceleration and deceleration instruction in this case can be divided into the acceleration and deceleration part and the low speed part as shown in FIG. 14. From this FIG. 14, in the override algorithm on the host computer side, first, $\omega_p\text{-}\delta(Tp)$ is calculated by the following equation 2-2 and 2-3.

$$\Delta\theta - \omega_P \cdot \delta(T_P) = \left(\frac{100}{P} - 1\right) \cdot 2T_P \cdot \omega_P \quad (2\text{-}2)$$

$$\therefore \omega_P \cdot \delta(T_P) = \frac{\Delta\theta}{\left(\frac{100}{P} - 1\right) \cdot 2T_P + \delta} \cdot \delta(T_P) \quad (2\text{-}3)$$

Subsequently, respective values of the $\Delta\theta$, $\beta\text{-}\omega_p\cdot\delta(Tp)$, and 2Tp (100/P−1), $\omega_p$, $\Delta\theta\text{-}\omega_p\cdot\delta(Tp)$ are transmitted to the servo side.

On the other hand, on the servo side, the step signal of the $\beta\cdot\omega_p\cdot\delta(Tp)/s$ is input to the servo position input using the $\beta\cdot\omega_p\cdot\delta(Tp)$ received from the host computer. Simultaneously with this, the motor position of $0\le t \le Tp$ is stored in the memory.

When t becomes equal to Tp, the instruction value is increased by increments of $\omega_p\cdot T_{ss}$ at every sampling time $T_{ss}$ of the servo circuit. By this, it will be increased by $n\cdot\omega_p\cdot T_{ss}$ the n-th times. The negative/positive state of equation 2-4 is verified. Then, when this equation 2-4 becomes 0 or less, the motor position is read out from the memory at every sampling time $T_{ss}$, and the processing of FIG. 8 is carried out.

$$\{\Delta\theta - \omega_p\cdot\delta(T_p)\} - n\cdot\omega_p\cdot T_{ss} \quad (2\text{-}4)$$

(3) Error in step-exponential method

As mentioned above, the numerical control method by the step-exponential method is effective for effecting the short tact of a short pitch and operates sufficiently for practical use. Note, along with the higher precision of the controlled system, there sometimes occurs a case where satisfactory control cannot be carried out since an error is included in the above-described method. This point will be investigated.

(3-1) Precision of $\beta$ and $\delta(Tp)$

The already mentioned constant $\beta$ and $\delta(Tp)$ are eigen values of the servo loop and are values defined by the following equation 3-1.

$$\begin{cases} \beta = \frac{1}{\dot{\theta}(T_P)} \\ \delta(T_P) = \frac{\theta(T_P)}{\dot{\theta}(T_P)} = \frac{1}{\beta} \cdot \frac{1}{\dot{\theta}(T_P)} \end{cases} \quad (3\text{-}1)$$

In this case, $\theta$ and $\theta$ dot are given by equation 1-4. As is clear from the related equation 1-4, $\theta$ and $\theta$ dot are determined by the time constants $T_1$, $T_2$, and $T_3$, and further these time constants are determined by the servo parameters Ki, Kp, and K. That is, $\theta$ and $\theta$ dot are determined by the servo tuning, and therefore strictly speaking, usually the constants $\beta$ and $\delta(Tp)$ become different values for every robot and for every axis.

However, if this is done, the operation becomes cumbersome, and therefore if the servo loop characteristic is tuned to for example the Butterworth characteristic of equation 1-9, $\beta$ and $\delta(Tp)$ of the same value can be adopted for every robot and for every axis. Note, even in this case, the viscosity and friction of the motor mechanical system differ for every robot and every axis, and these cannot be strictly managed, and therefore $\beta$ and $\delta(Tp)$ include error after all.

Concretely, in the step-exponential method, $\beta\cdot\Delta\theta$ is transmitted from the host computer to the servo side, but when the error of $\beta$ at this time is defined as $\Delta\beta$, the error of $\Delta\beta\cdot\Delta\theta$ will be generated. Accordingly, when $\beta$ bar is defined as a nominal value, the error $\Delta\beta\cdot\Delta\theta$ is expressed by the following equation 3-2. The amount of error of $\Delta\theta$ can be estimated from this.

$$\Delta\beta \cdot \Delta\theta = \bar{\beta}\frac{\Delta\beta}{\bar{\beta}} \cdot \Delta\theta = \frac{\bar{\beta}}{100} \cdot \frac{100\Delta\beta}{\bar{\beta}} \cdot \Delta\theta$$

$$= \frac{\bar{\beta}}{100} e_\beta \cdot \Delta\theta$$

where, $e_\beta$ expresses an error of $\beta$ by % ... (3-2)

Figure 15:
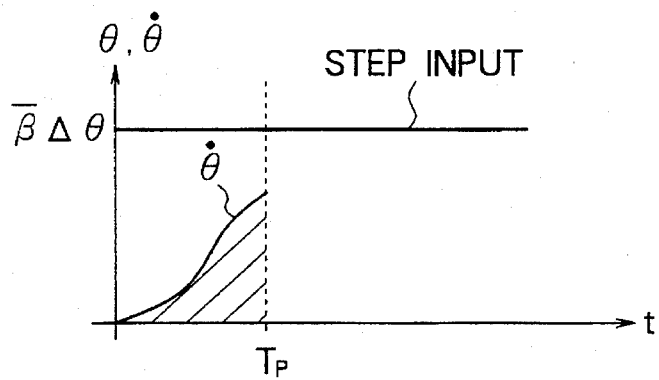
FIG. 15 is a graph of an acceleration pattern for explaining an error in the step-exp method according to the present invention.

In this way, if the error $\Delta\beta\cdot\Delta\theta$ exists in $\Delta\theta$, there is a concern that the following inconvenience may occur. That is, in FIG. 15, ideally the surface area of the hatching part must be $\Delta\theta/2$, but the input of the step signal is not:

$$\bar{\beta}\cdot\Delta\theta$$

and the following is input:

$$\bar{\beta}\cdot\left(1\pm\frac{\Delta\beta}{\bar{\beta}}\right)\cdot\Delta\theta$$

and therefore the actual surface area of the hatching part becomes:

$$\frac{1}{2}\left(1\pm\frac{\Delta\beta}{\bar{\beta}}\right)\Delta\theta \quad (3\text{-}3)$$

Accordingly, after t=Tp, it is increased (decreased) exactly by:

$$\pm\frac{1}{2}\frac{\Delta\beta}{\bar{\beta}}\cdot\Delta\theta$$

and even if the processing shown in FIG. 8 is carried out, strictly speaking an ideal exponential curve is not exhibited, and an adverse influence will be exerted upon the motor operation. For this reason, in the actual servo input, it is necessary to input a value considering the error of $\beta$ and $\delta(Tp)$.

(3-2) Detection error of speed peak point t=Tp

On the servo side, the position of the motor is sampled at a $T_{ss}$ cycle (for example 2.5 msec), and therefore a sampling error is generated. As this sampling error, two types mentioned below can be considered. Note, an explanation will be made by assuming that an error of $\beta$ is not present.

Figure 16:
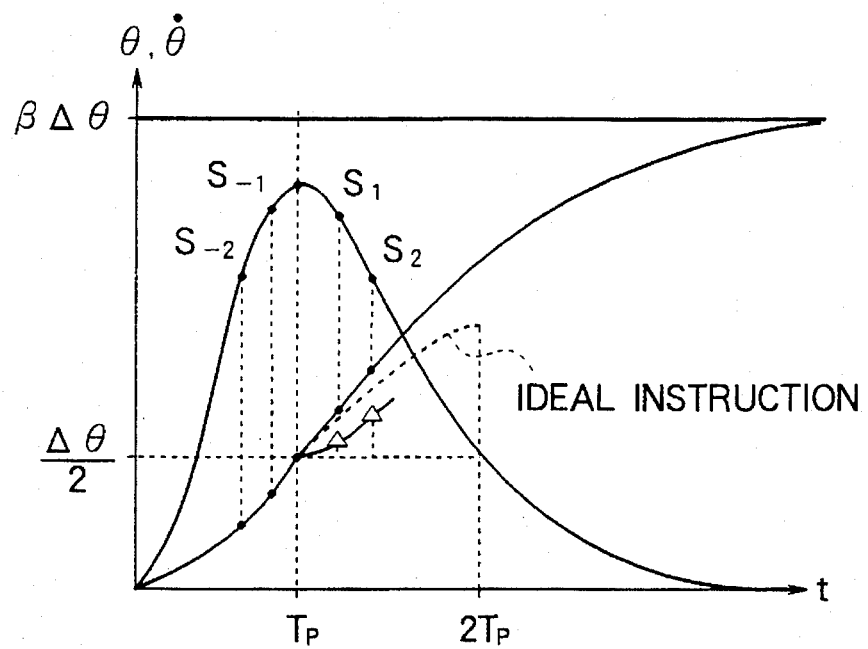
FIG. 16 is a graph of the acceleration pattern for explaining an error in the step-exp method according to the present invention in the same way as the above.

First, in FIG. 16, the sampling point $S_i$ at every $T_{ss}$ cycle is indicated by "$\Delta$". Where:

$$\dot{\theta}(S_{-1}) \ge \dot{\theta}(S_1)$$

the passing of the peak point can be detected at a sampling point $S_1$, but in the step-exponential method, $S_1, S_2, \ldots$ are determined according to FIG. 8 ("$\Delta$" of FIG. 16), and therefore it will be out of the ideal exponential pattern between the sampling points $S_{-1}$ and $S_1$. This is because Tp has not become a whole multiple of TSS, and t=Tp is deviated from the sampling point.

Figure 17:
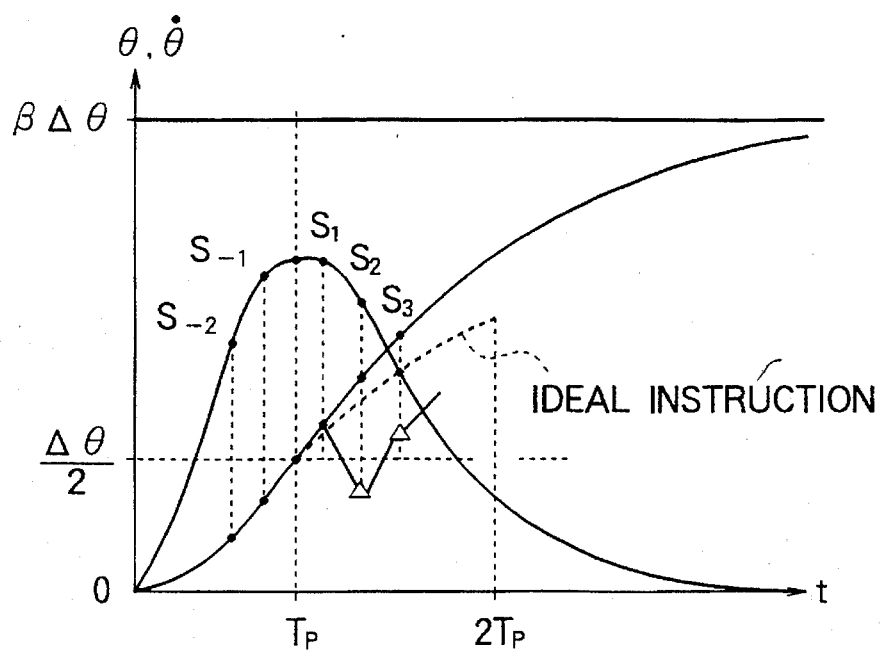
FIG. 17 is a graph of the acceleration pattern for explaining an error in the step-exp method according to the present invention in the same way as the above.

The other sampling error is the case shown in FIG. 17. That is, when:

$$\dot{\theta}(S_{-1}) < \dot{\theta}(S_1)$$

it has not yet been possible to perform the peak detection at the sampling point S1, the peak point is detected at first at S2, and the processing of the step-exponential method is entered from this point S2. For this reason, it becomes a point Δ shown in FIG. 17, which is out of the ideal exp pattern.

In any case, the position instruction value deviates from the ideal instruction before or after t=Tp due to the sampling error, but the servo loop can be grasped as one type of filter (low pass filter), and therefore it can be considered that the actual adverse influence is small. Note, it is also possible to consider a case where this sampling error exceeds an allowable range, and therefore the algorithm of a method of correcting this will be mentioned later.

(3-3) Difference of servo frequency-characteristic of respective axes

An important element in the above-mentioned step-exp method is Tp. This Tp is a physical amount uniformly determined by the servo loop characteristic (pole arrangement). On the other hand, in the PTP operation of a multiple-axis robot, a simultaneous start and simultaneous stop are the rule, but to realize this by the step-exp method, it is necessary to make the servo characteristics of the respective axes (θ1, θ2, Z, R), that is, Tp, match. Unless this is done, if an orthogonal type robot is made to operate along the X and Y axes by the step-exp method, the end effect path is not the ideal straight line motion.

Figure 18:
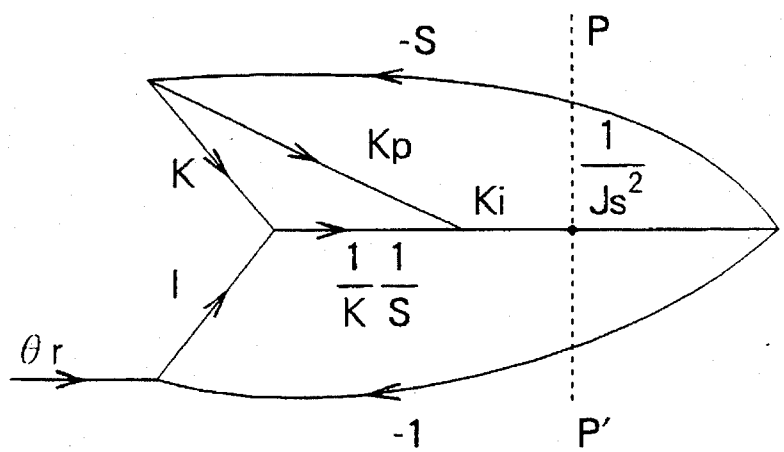
FIG. 18 is a line drawing of a signal flow showing the servo loop for explaining a difference of the servo frequency-characteristic in the present invention.

It is, however, impossible to make the servo loop characteristics of the respective axes completely match. To solve this problem, a loop construction which enables this to be done in principle is adopted. Namely, in the servo loop of the present invention, the left side from the line P—P in FIG. 18 has a control structure based on software, and the right side has a control structure based on hardware, and therefore if the values of the parameters K and Kp on the left side are made exactly the same values at the respective axes, exactly the same characteristics are exhibited in the respective axes. On the other hand, although the characteristic differs for every axis in the hardware part on the right side of the line P—P, if the difference is adjusted by the parameter Ki, it becomes possible to make all axes have the same characteristic after all.

(4) Correction of error in step-exp method

Next, one example of the correction algorithm of an error in the step-exp method of the present invention mentioned above will be explained.

(4-1) Correction method of β and δ(Tp) error

According to the above-mentioned equation 3-3, if it is assumed that β contains an error by exactly an amount of ±Δβ with respect to the nominal value β bar, after t=Tp, an error of:

$$\pm \frac{1}{2} \cdot \frac{\Delta\beta}{\bar{\beta}} \cdot \Delta\theta$$

is contained. This value can be determined at a point of time of detecting t=Tp, and that value becomes equation 4-1:

$$\frac{\Delta\theta}{2} - \theta(T_P) = \pm \frac{1}{2} \cdot \frac{\Delta\beta}{\bar{\beta}} \cdot \Delta\theta \quad (4\text{-}1)$$

Here, θ(Tp) is an amount of movement until t=Tp. This value can be naturally determined by the servo side. Note that, this value is ideally Δθ/2.

So as to correct the error amount of equation 4-1 after t=Tp, proportional division is carried out based on a speed information θ(S-i) dot in a period of 0≤t≤Tp in accordance with the speed and correction is carried out in a period of Tp≤t≤2Tp. That is, when it is assumed that the correction amount at the sampling point Si is Δei, it can be expressed by the following equation 4-2.

$$\Delta e_1 = \frac{\dot{\theta}(S_{-1})}{\sum\limits_{K}^{N} \dot{\theta}(S_{-K})} \cdot \left( \pm \frac{1}{2} \cdot \frac{\Delta\beta}{\bar{\beta}} \cdot \Delta\theta \right) \quad (4\text{-}2)$$

When doing this, equation 4-1, which is the total error, is divided in proportion to the magnitude of speed of the exp speed pattern, and it will not exert a great influence upon the pattern after t=Tp. Note that, it is assumed that Δθ is input as the instruction value without fail at a point of time when t=Tp, whereby error in calculation and other errors are absorbed.

(4-2) Correction method of detection error of speed peak point t=Tp

As already mentioned, there are two types of detection errors of the speed peak point t=Tp. Therefore an explanation will be made also of the correction method thereof for each of the two types of detection errors.

Figure 19:
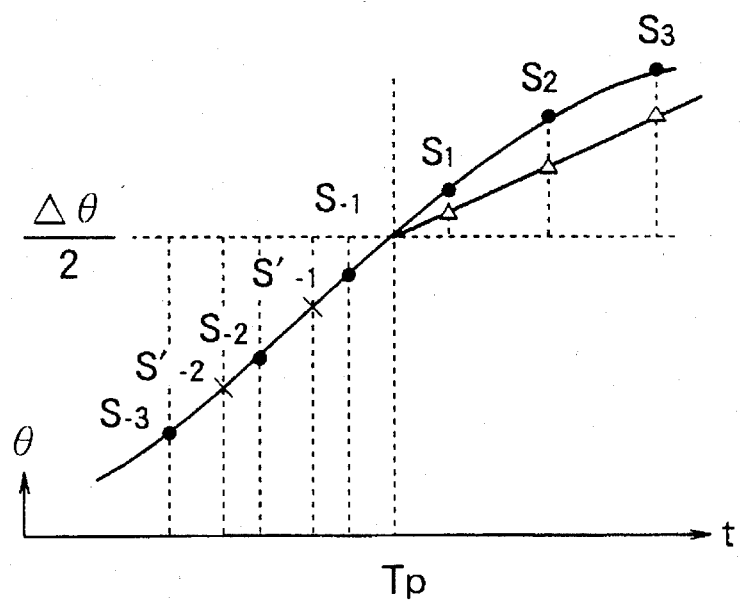
FIG. 19 is a graph of the position pattern for explaining a method of correction of an error in the step-exp method shown in FIG. 16.

First, in the detection error of the type shown in FIG. 16, there was a problem that, if the step-exp method was applied according to FIG. 8 after the speed peak was clarified at S1 shown in the same figure, it became a point Δ in FIG. 19, and the pattern was deviated from the ideal one. Then, the cause was that t=Tp and the sampling point were deviated.

Therefore, in the present correction method, this deviation in this time axis direction is corrected. Namely, from FIG. 19, the following can be decided:

$$\theta(S_{-1}) \leq \theta/2 \leq \theta(S_1) \quad (4\text{-}3)$$

and therefore since the method of generation of the ideal position instruction is to produce an instruction which is point symmetrical relative to the peak point of t=Tp, point symmetry is exhibited using the value of the X point at a point S'−1 at which it becomes Tp−t (S'−1) from t (S1)−Tp=t2. However, the point S'−1 is not a real sampling point, and therefore it is necessary to perform interpolation using the values θ(S−1) and θ(S−2) stored at real sampling points S−1 and S−2. This is true also for a general point S'−1.

Figure 20:
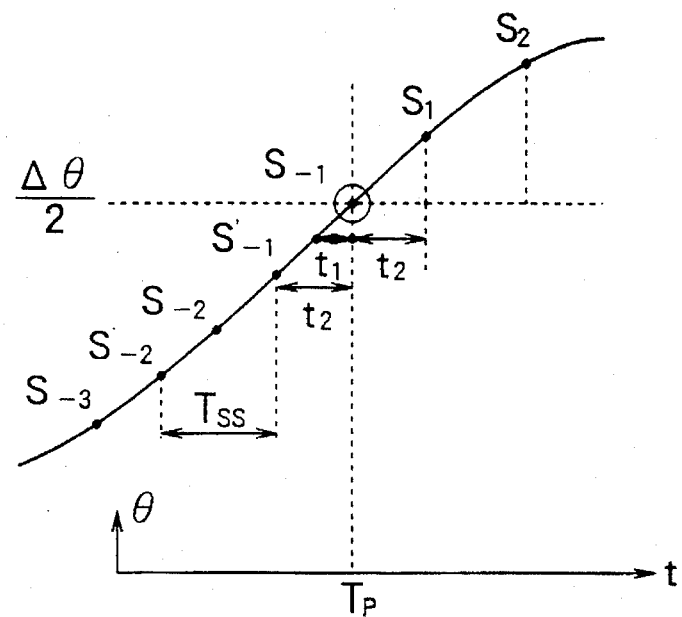
FIG. 20 is an enlarged view of FIG. 19.

This linear interpolation is expressed as follows from FIG. 20:

$$\begin{cases} t_1 + t_2 = T_{S3} & (4\text{-}4) \\ \dfrac{\theta(S_{-1}) - \theta(S_{-2})}{T_{S3}} = \dfrac{\theta(S_{-1}) - \theta(S_{-1}')}{t_2 - t_1} & (4\text{-}5) \\ \dfrac{\dfrac{\Delta\theta}{2} - \theta(S_{-1})}{t_1} = \dfrac{\theta(S_1) - \theta(S_{-1})}{T_{S3}} & (4\text{-}6) \end{cases}$$

When this is solved for θ(S−1), it becomes:

$$\theta(S_{-1}') = \theta(S_{-1}) - (\theta(S_{-1}) - \theta(S_{-2})) \quad (4\text{-}7)$$

$$\left( 1 - 2 \cdot \frac{\frac{\Delta\theta}{2} - \theta(S_{-1})}{\theta(S_1) - \theta(S_{-1})} \right)$$

and when it is generalized and θ(S−1) is obtained, it becomes:

$$\theta(S_{-I}') = \theta(S_{-I}) - (\theta(S_{-I}) - \theta(S_{-i-1})) \quad (4\text{-}8)$$

$$\left(1 - 2 \cdot \frac{\frac{\Delta\theta}{2} - \theta(S_{-1})}{\theta(S_1) - \theta(S_{-1})}\right)$$

After S1, it is sufficient if the instruction according to the step-exp method is calculated as in FIG. 8 using this θ(S'−1).

Figure 21:
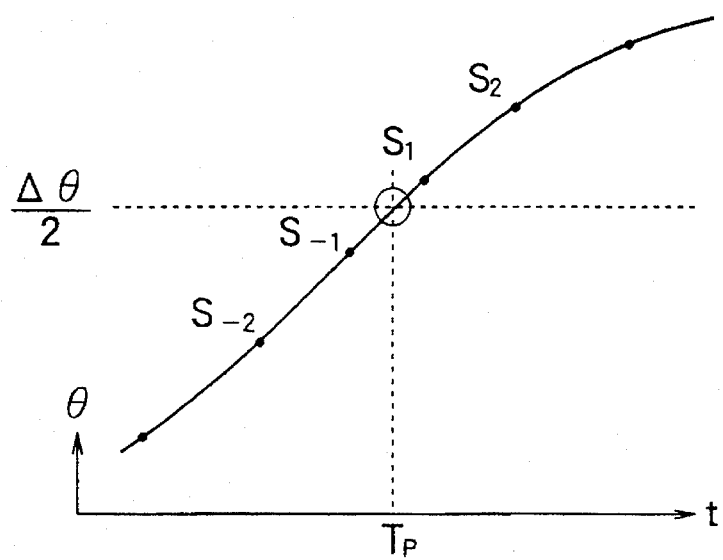
FIG. 21 is a graph of the position pattern for explaining a method of correction of an error in the step-exp method shown in FIG. 17.

Next, the detection error of the type shown in FIG. 17 is basically the same as the detection error shown in FIG. 16, but it differs from the latter in that the speed peak is detected at first at the sampling point S2. Namely, as is clear also from FIG. 21, so as to distinguish the type of these detection errors, it is sufficient if the magnitude relative to the center point Δθ/2 of the movement distance is verified. That is, when:

$$-\frac{\Delta\theta}{2} \leq \theta(S_1) < \theta(S_2) \quad (4\text{-}9)$$

it becomes the error of the latter type. In this case, it is sufficient if the correction method of the detection error of the former type equation 4–8 is used from i=2.

Figure 1:
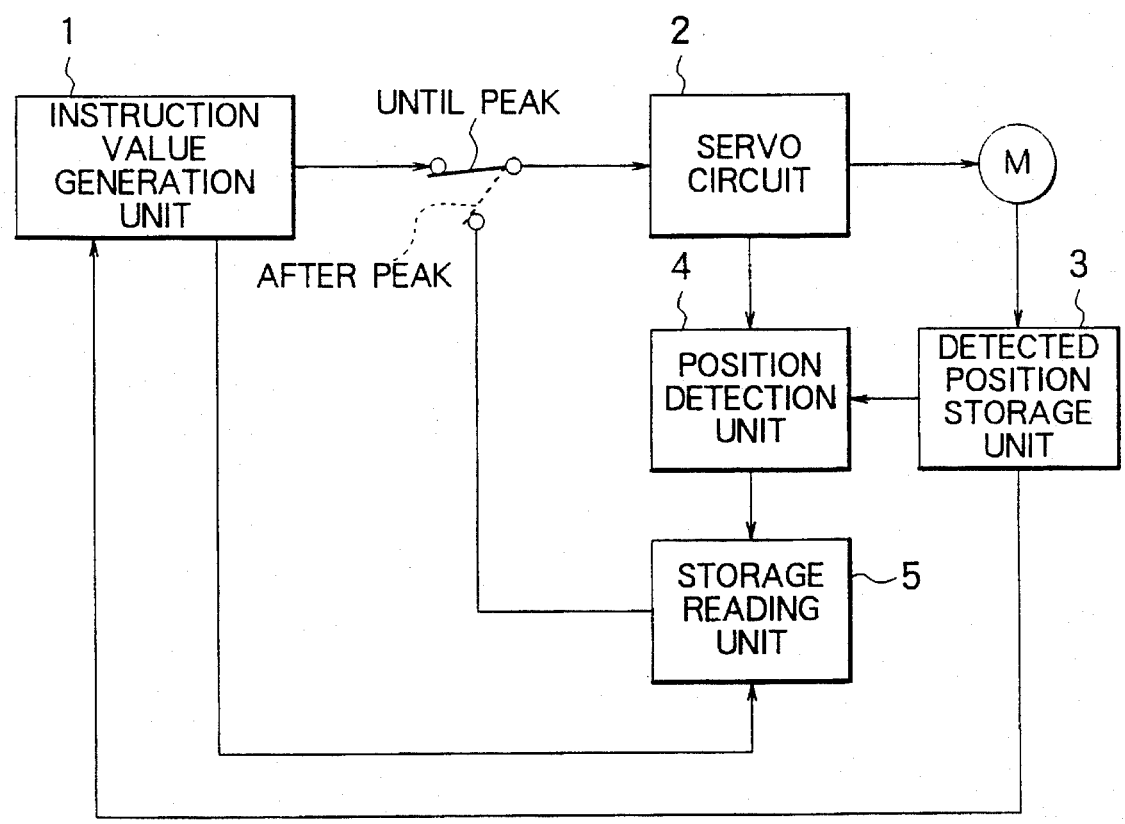
FIG. 1 is a view of an example of a configuration of a numerical control apparatus according to the present invention.

Thus, when an example of the device putting the above-described numerical control method into practice is illustrated, the configuration as in FIG. 1 is exhibited.

The numerical control device has an instruction value generation unit 1 as illustrated and transmits the control signal in relation to the position instruction value which was taught to a servo circuit 2 concerning an actuator M such as a motor or the like. In this case, a current position signal from an encoder (position detection unit) detecting the movement position of the actuator M is fetched into the instruction value generation unit 1.

Also, the detection position storage unit 4 and the storage reading unit 5 are in relation to the production of the deceleration pattern. That is, by transmitting the acceleration pattern obtained by the instruction value generation unit 1 via the servo circuit 2 to the actuator M, the pattern of the actuator M which actually operated is detected by the encoder 3 and this is transmitted to the detection position storage unit 4 and stored in the detection position storage unit 4 according to an order of the elapse of time. Then, after t=Tp, that is, at a time of deceleration, the speed value (obtained by differentiating the position information) stored in the detection position storage unit 4 is taken out by the storage reading unit 5 in an order inverse to the storage order to perform the pattern production. By this, a deceleration pattern obtained by reversing in time the speed elapse of the acceleration pattern is obtained. This is transmitted to the servo circuit 2.

Note that, the numerical control is carried out in parallel to the drive axes of the respective arms, and the control values obtained as the results of the pattern production are transmitted to the respective servo circuits. Also, the instruction value generation unit 1 and the storage reading unit 5 are realized by software processing in actuality, and the function thereof is visually indicated in the figure.

The embodiments explained above were described so as to facilitate understanding of the present invention and were not described so as to restrict the present invention. Accordingly, the elements disclosed in the above-described embodiments include all design changes and equivalents belonging to the technical range of the present invention.

As mentioned above, according to the present invention, an actuator can be controlled by the value of the *limit of capability possessed by the servo loop without a necessity of complex calculation in a CPU and a short tact in a short pitch operation can be realized. Also, after t=Tp, the position instruction signal can be produced merely by reading information stored in the detected position storage unit, and it is not necessary to perform a complex calculation in the CPU.

Further, this algorithm is theoretically clear, and there is no margin for interference due to the poor ability, experience, etc. of a designer. In addition, the cumbersome process of obtaining an enormous amount of individual experimental data for every robot and utilizing them for the control can be eliminated.

What is claimed is:

1. A numerical control apparatus in which a position instruction signal is transmitted to a servo circuit having a certain characteristic from an instruction value generation unit based on input target position information and position information from a position detection unit detecting a movement position of an actuator and the operation of at least one actuator is controlled by this servo circuit;

said numerical control apparatus comprising:

detected position storage unit storing the operation position information of said actuator detected by said position detection unit;

a storage reading unit reading out the operation position information stored in said detection position storage unit by folding back the same at a middle point of the route based on a signal from said instruction value generation unit and transmits the same to said servo circuit:

wherein a transmission signal from said instruction value generation unit is a step signal of a value (β·Δθ) obtained by multiplying with the target amount of movement an eigen value (β) obtained so that the amount of movement up to the eigen acceleration and deceleration time (Tp) of said servo circuit becomes one-half of the target amount of movement (Δθ).

2. A numerical control apparatus as set forth in claim 1, wherein said middle point of the route is the eigen acceleration and deceleration time (Tp) of the aforesaid servo circuit.

3. A numerical control apparatus as set forth in claim 1, wherein said middle point of the route is a point where the speed differential of the position information detected by said position detection unit becomes negative.

4. A numerical control apparatus as set forth in claim 1, wherein said middle point of the route is calculated based on the target position information which is input.

5. A numerical control apparatus as set forth in claim 1, wherein the operation of said actuator is controlled by an arbitrary movement time irrespective of said input target position information.

6. A numerical control method for controlling the operation of at least one actuator by a servo circuit having a certain characteristic comprising the steps of:

determining an eigen value (β) by which an amount of movement up to an eigen acceleration and deceleration time (Tp) of said servo circuit becomes one half of a target amount of movement (Δθ) which is input;

determining a value (β·Δθ) by multiplying the eigen value with the target amount of movement; and controlling the operation of said actuator during a time from at least the start of the operation to said eigen acceleration and deceleration time by inputting to the servo circuit a step signal of the value (β·Δθ).

7. The numerical control method as set forth in claim 6, further comprising the steps of:

storing the operation of said actuator as information at a predetermined time interval;

folding back the stored information about said eigen acceleration and deceleration time (Tp) as a symmetrical axis to produce operation information; and controlling the operation of said actuator after said eigen acceleration and deceleration time based on the operation information.

8. The numerical control method as set forth in claim 6, further comprising the step of:

further controlling the operation of said actuator by inputting a step signal of the target amount of movement ($\Delta\theta$) to said servo circuit after said eigen acceleration and deceleration time.

9. A numerical control apparatus in which a position instruction signal is transmitted to a servo circuit having a certain characteristic from an instruction value generation unit based on input target position information and position information from a position detection unit detecting movement position of the actuator and operation of at least one actuator controlled by this servo circuit, said numerical control apparatus comprising:

a detected position storage unit storing operation position information of said actuator detected by said position detection unit; and a storage reading unit reading out the operation position information stored in said detection position storage unit by folding back the same at a middle point of the route based on a signal from said instruction value generation unit and transmitting same to said servo circuit;

wherein a transmission signal from said instruction value generation unit is a step signal of a value ($\beta \cdot \Delta\theta$) obtained by multiplying with the target amount of movement an eigen value ($\beta$) obtained so that the amount of movement up to the eigen acceleration and deceleration time (Tp) of said servo circuit becomes one-half of the target amount of movement ($\Delta\theta$).

10. The numerical control apparatus as set forth in claim 9, wherein said middle point of the route is the eigen acceleration and deceleration time (Tp) of the aforesaid servo circuit.

11. The numerical control apparatus as set forth in claim 9, wherein said middle point of the route is a point where the speed differential of the position information detected by said position detection unit become negative.

12. The numerical control apparatus as set forth in claim 9, wherein said middle point of the route is calculated based on the input target position information.

13. The numerical control apparatus as set forth in claim 9, wherein the operation of said actuator is controlled by an arbitrary movement time irrespective of said input target position information.

14. A numerical control method for controlling the operation of at least one actuator by a servo circuit having a certain characteristic comprising the steps of:

determining an eigen value ($\beta$) by which an amount of movement up to an eigen acceleration and deceleration time (Tp) of said servo circuit becomes one half of a target amount of movement ($\Delta\theta$) which is input;

determining a value ($\beta \cdot \Delta\theta$) by multiplying the eigen value with the target amount of movement;

controlling the operation of said actuator during a time from at least the start of the operation to said eigen acceleration and deceleration time by inputting to the servo circuit a step signal of the value ($\beta \cdot \Delta\theta$);

storing the operation of said actuator as information at a predetermined time interval;

folding back the stored information about said eigen acceleration and deceleration time (Tp) as a symmetrical axis to produce operation information; and controlling the operation of said actuator after said eigen acceleration and deceleration time based on the operation information.

\* \* \* \* \*